(12) United States Patent
Bickham et al.

(10) Patent No.: US 8,467,649 B2
(45) Date of Patent: Jun. 18, 2013

(54) LARGE EFFECTIVE AREA FIBER

(75) Inventors: Scott Robertson Bickham, Corning, NY (US); Dana Craig Bookbinder, Corning, NY (US); Ming-Jun Li, Horseheads, NY (US); Snigdharaj Kumar Mishra, Wilmington, NC (US); Daniel Aloysius Nolan, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 286 days.

(21) Appl. No.: 12/872,051

(22) Filed: Aug. 31, 2010

(65) Prior Publication Data
US 2011/0129191 A1    Jun. 2, 2011

Related U.S. Application Data

(60) Provisional application No. 61/265,044, filed on Nov. 30, 2009.

(51) Int. Cl.
*G02B 6/036* (2006.01)

(52) U.S. Cl.
USPC ............................................. 385/127

(58) Field of Classification Search
None
See application file for complete search history.

(56) References Cited

U.S. PATENT DOCUMENTS
2008/0279517 A1 * 11/2008 Bickham et al. ............. 385/124

FOREIGN PATENT DOCUMENTS
EP          1852721       11/2007
WO       2008/157341    12/2008

* cited by examiner

*Primary Examiner* — Jerry Rahll
(74) *Attorney, Agent, or Firm* — Robert L. Carlson

(57) ABSTRACT

An optical fiber with a glass core extending from a centerline to a radius $R_1$ wherein $R_1$ is greater than about 5 μm; a glass cladding surrounding and in contact with the core. The cladding has a depressed annular region, the inner radius of said depressed annular region is spaced from said core a distance greater than 1 μm and less or equal to than 5 μm. The core and the cladding provide a fiber with cable cutoff less than 1550 nm, and an effective area at 1550 nm greater than 120 μm² and bend loss of ≦0.7 dB/turn on a 20 mm diameter mandrel.

18 Claims, 2 Drawing Sheets

Radius (microns)

LARGE EFFECTIVE AREA FIBER

CROSS-REFERENCE TO RELATED APPLICATIONS

This application claims the benefit of, and priority to U.S. Provisional Patent Application No. 61/265,044 filed on Nov. 30, 2009 entitled, "Large Effective Area Fiber", the content of which is relied upon and incorporated herein by reference in its entirety.

BACKGROUND OF THE INVENTION

1. Field of the Invention

The present invention relates generally to optical fiber, and particularly optical fibers which have large effective area and low bend loss at 1550 nm.

2. Technical Background

Optical amplifier technology and wavelength division multiplexing techniques are typically required in telecommunication systems that provide high power transmissions for long distances. The definition of high power and long distances is meaningful only in the context of a particular telecommunication system wherein a bit rate, a bit error rate, a multiplexing scheme, and perhaps optical amplifiers are specified. There are additional factors, known to those skilled in the art, which have impacted upon the definition of high power and long distance. However, for most purposes, high power is an optical power greater than about 10 mW. In some applications, single power levels of 1 mW or less are still sensitive to non-linear effects, so that the effective area is still an important consideration in such lower power systems.

Generally, an optical waveguide fiber having a large effective area ($A_{eff}$) reduces non-linear optical effects, including self-phase modulation, four-wave-mixing, cross-phase modulation, and non-linear scattering processes, all of which can cause degradation of signals in high powered systems.

On the other hand, an increase in effective area of an optical waveguide fiber typically results in an increase in macrobending induced losses which attenuate signal transmission through a fiber. The macrobending losses become increasingly significant over long (e.g., 100 km, or more) distances (or spacing between regenerators, amplifiers, transmitters and/or receivers). Unfortunately, the larger the effective area of a conventional optical fiber is, the higher the macrobend induced losses tend to be.

SUMMARY

Optical fibers are disclosed herein which comprise a glass core extending from a centerline to a radius $R_1$ wherein $R_1$ is greater than about 5 µm; a glass cladding surrounding and in contact with the core; the cladding comprising a depressed index region the inner radius of which is spaced from the core a distance greater than 1 micron and less than 5 microns. The core and the cladding provide a fiber with cable cutoff less than 1500 nm, and an effective area at 1550 nm greater than 110 µm² and bend loss of ≦0.7 dB/turn on a 20 mm diameter mandrel. In some embodiments the effective area at 1550 nm is greater than 115 µm² and in some embodiments the effective area at 1550 nm is greater than 120 µm², more preferably greater than 130 µm², even more preferably greater than 140 µm², and most preferably greater than 150 µm².

The depressed annular region preferably comprises fluorine. Alternatively, the depressed annular region may contain an annular region of silica based glass with at least 10 (and more preferably at least 50) randomly dispersed closed holes situated therein, and (i) mean distance between the holes is less than 5000 nm, and (ii) at least 80% of the holes have a maximum cross-sectional dimension Di of less than 1000 nm. Preferably the bend loss at 1550 nm is less than 0.5 dB/turn, less than 0.25 dB/turn, and more preferably less than 0.1 dB/turn, on a 20 mm diameter mandrel. In some exemplary embodiments the bend loss at 1550 nm is less than 0.08 dB/turn, and an in some exemplary embodiments the bend loss is less than 0.06 dB/turn on a 20 mm diameter mandrel.

Reference will now be made in detail to the present preferred embodiments of the invention, examples of which are illustrated in the accompanying drawings.

DETAILED DESCRIPTION OF THE PREFERRED EMBODIMENTS

Figure 1:
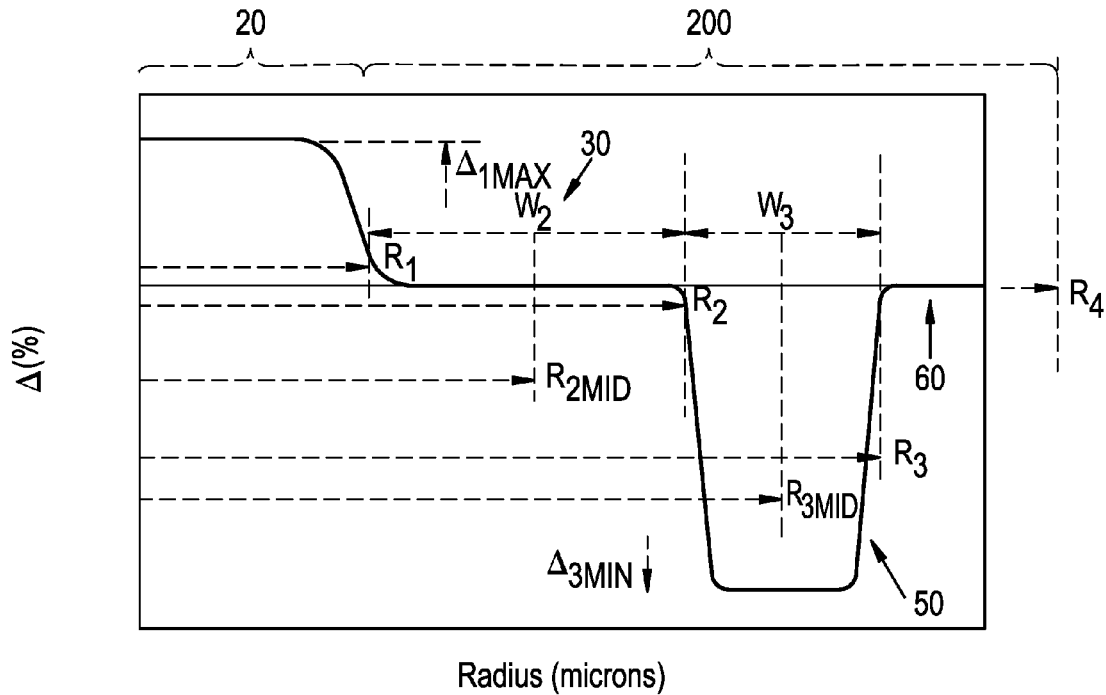
FIG. 1 shows a relative refractive index profile of an embodiment of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the third annular region 60 (outer region) of the cladding. As used herein, the relative refractive index is represented by $\Delta$ and its values are given in units of "%", unless otherwise specified. In cases where the refractive index of a region is less than the average refractive index of the third annular region 60, the relative index percent is negative and is referred to as having a depressed region or depressed index, and the minimum relative refractive index is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength. Kappa is the ratio of the dispersion to the dispersion slope.

"Effective area" is defined as:

$$A_{eff} = 2\pi (\int f^2 r\, dr)^2 / (\int f^4 r\, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" or "alpha profile" refers to a relative refractive index profile, expressed in terms of Δ(r) which is in units of "%", where r is radius, which follows the equation, $$\Delta(r)=\Delta(r_o)(1-[|r-r_i|/(r_f-r_i)]^\alpha),$$

where $r_i$ is the point at which Δ(r) is maximum, $r_f$ is the point at which Δ(r) % is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int f^2\ r\ dr/\int [df/dr]^2\ r\ dr)$, the integral limits being 0 to ∞.

The bend resistance of a waveguide fiber can be gauged by induced attenuation under prescribed test conditions, for example by deploying or wrapping the fiber around a mandrel of a prescribed diameter.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff", as used herein, means cable cutoff as measured using the 22 m cable cutoff test described in EIA-455-170 Cable Cutoff Wavelength of Single-mode Fiber by Transmitted Power, or "FOTP-170".

Figure 2:
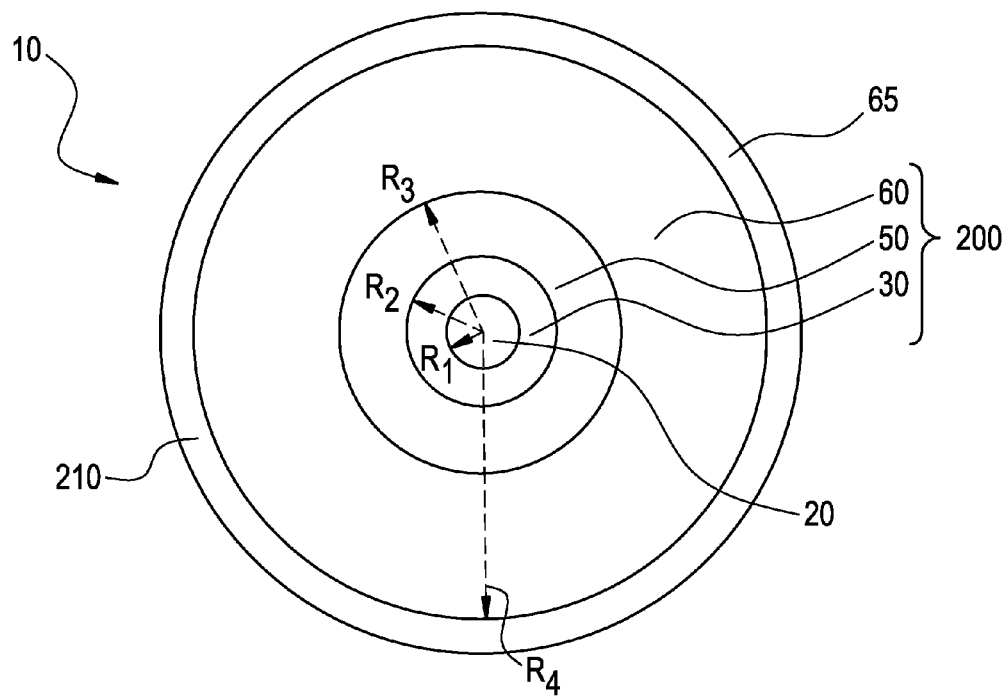
FIG. 2 is a schematic cross-sectional view of an embodiment of an optical waveguide fiber as disclosed herein.
Figure 3:
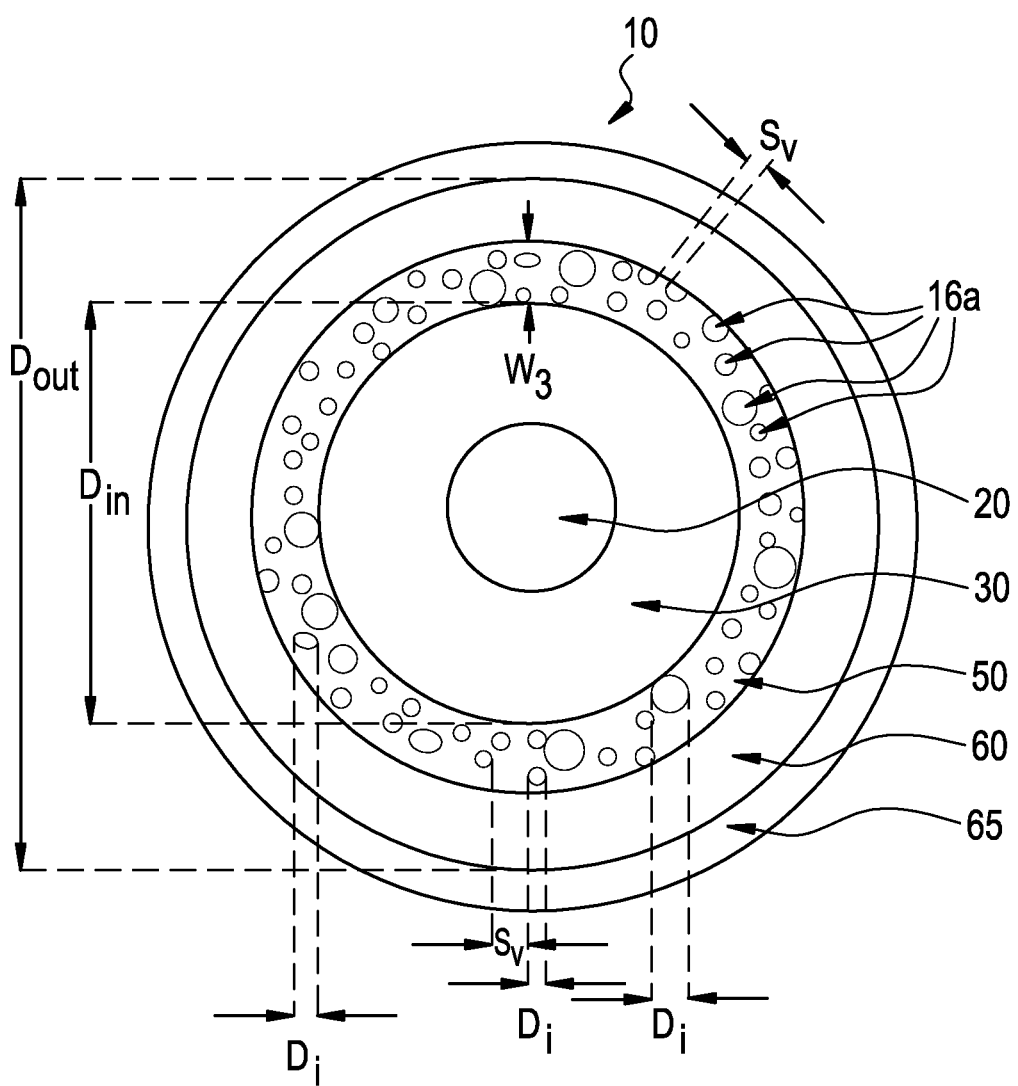
FIG. 3 is a schematic cross-sectional view of another embodiment of an optical waveguide according to the present invention.

Referring to FIGS. 1-3, the optical fiber 10 disclosed herein may comprise a core 20 having $\Delta_{1MAX}$ and a cladding layer (or cladding) 200 which may surround and may be directly adjacent the core.

In some preferred embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density.

In some embodiments, the refractive index profile of the optical fiber 10 disclosed herein is non-negative from the centerline to the inner radius $R_2$ of the annular region 30. In some embodiments, the optical fiber 10 contains no significant index-increasing dopants in the core 20, and in particular substantially no germanium oxide. The core may include an alkali metal oxide, preferably an oxide of K, Na, Li, Cs, or Rb, or a mixture thereof. In accordance with a preferred method of manufacturing the fiber, it is preferable to have the peak alkali metal oxide concentration in the preferred single mode optical fiber be substantially coincident with the centerline of the optical fiber. Preferably, the peak concentration of alkali metal oxide in the core of the optical fiber is in an amount between 20-1000 ppm wt. %; more preferably between 50-500 ppm wt. %; most preferably 50-300 ppm wt. %; and in some embodiments between 50-200 ppm wt. %. The peak amount of alkali metal oxide in the cladding of the optical fiber is preferably less than the peak amount of alkali metal oxide in the core. Preferably, the peak amount of alkali metal oxide in the cladding is less than about 100 ppm wt. %; more preferably less than about 60 ppm wt. %.

Referring to FIGS. 1 and 2 optical waveguide fibers 10 are disclosed herein which may comprise: a core 20 extending radially outwardly from the centerline to a central segment outer radius, $R_1$, and having a relative refractive index profile, $\Delta_1(r)$ in %, with a maximum relative refractive index percent, $\Delta_{1MAX}$ (preferably ≦0.3% and greater than 0.1%, more preferably between 0.1 to 0.25%). The core 20 is surrounded by cladding 200. In some embodiments, the core preferably is a step index profile, preferably with an α≧10, and $R_1$ is preferably >5 μm, more preferably between about 6.5 and 10 microns. In some other embodiments, the core has an alpha less than 10, preferably less than 6, more preferably less than 4, and $R_1$ is preferably >5 μm, more preferably between about 6.5 and 12 microns, more preferably between 8 and 12 microns. Cladding 200 comprises: a first annular region 30 surrounding the core 20 and directly adjacent thereto, extending radially outwardly to a second, depressed annular region 50. The first annular region 30 is defined by outer radius $R_2$, and has a width $W_2$ ($W_2=R_2-R_1$), and a relative refractive index profile, $\Delta_2(r)$ in %, with a maximum relative refractive index percent, $\Delta_{2MAX}$, in % (where $\Delta_{2MAX}$ is preferably between 0.05% and −0.05%, more preferably between 0.025% and −0.025%), a minimum relative refractive index percent, $\Delta_{2MIN}$, in %, and $\Delta_{1MAX} > \Delta_2$. Depressed annular region 50 surrounds first annular region 30 and is directly adjacent thereto, and extends radially outwardly from $R_2$ to a radius $R_3$, the region 50 having a width ($W_3=R_3-R_2$). In some preferred embodiments, $W_3$ is between about 10 and 25 microns and has a relative refractive index profile, $\Delta_3(r)$ in percent (%), with a minimum relative refractive index percent, $\Delta_{3MIN}$, in % (preferably $\Delta_{3MIN} \geq -0.25$, more preferably >−0.2, even more preferably >0.15%, and even more preferably $\Delta_{3MIN} \geq -0.1$%), wherein $\Delta_{1MAX} > 0 > \Delta_{3MIN}$, and $\Delta_{1MAX} > \Delta_{2MAX} > \Delta_{3MIN}$. In some other preferred embodiments, $W_3$ is between about 2 and 10 microns and has a relative refractive index profile, $W_3(r)$ in percent (%), with a minimum relative refractive index percent, $\Delta_{3MIN}$, in % (preferably $\Delta_{3MIN} < -0.15$%, more preferably $\Delta_{3MIN} < -0.25$%, and even more preferably ≦−0.3%), wherein $\Delta_{1MAX} > 0 > \Delta_{3MIN}$, and $\Delta_{1MAX} > \Delta_{2MAX} > \Delta_{3MIN}$. A third annular region 60 preferably surrounds the region 50 and is directly adjacent thereto and has a relative refractive index percent, $\Delta_4(r)$ in %.

The outer core radius $R_1$ is defined to occur at the radius where $\Delta_1(r)$ first reaches +0.05%. That is, core 20 ends and the annular region 30 starts where the relative refractive index first reaches +0.05% (going outward radially) at a radius $R_1$, and region 30 is defined to end at a radius $R_2$ where the relative refractive index $\Delta_2(r)$ first reaches −0.05%, going outward radially. The depressed annular region 50 begins at $R_2$ and ends at $R_3$. $R_3$ is defined to occur where the relative refractive index $\Delta_3(r)$ reaches the value of −0.05% (going outward radially), after $\Delta_3(r)$ has dipped to at least −0.05%. The width $W_3$ of the depressed annular region 50 is $R_3-R_2$ and its midpoint is $R_{3MID}$ is $(R_2+R_3)/2$. In some embodiments, more than 90% of the core 20 has a positive relative refractive index, and in some embodiments $\Delta_1(r)$ is positive for all radii from 0 to $R_1$. In some embodiments, $|\Delta_2(r)| < 0.05$% and $|\Delta_{2\ max} - \Delta_{2\ min}| < 0.1$% for more than 50% of the radial width of the first annular region 30, and in other embodiments $|\Delta_2(r)| < 0.025$% for more than 50% of the radial width of the first annular region 30. $\Delta_3(r)$ is negative for all radii from $R_2$ to $R_3$. Preferably, $\Delta_{CLAD}(r)=0$% for all radii greater than 30 μm. Cladding 200 extends to a radius, $R_4$, which is also the outermost periphery of the glass part of the optical fiber.

The depressed annular region 50 may comprise silica glass having at least one dopant selected from the group consisting of boron, and fluorine. Alternatively, as shown in FIG. 3, the second annular region 50 may comprise silica based glass (either pure silica, or silica doped with for example, germanium, aluminum, phosphorus, titanium, boron, and fluorine) with a plurality of closed randomly dispersed holes 16A, the holes 16A being either empty (vacuum) or gas (e.g. argon, nitrogen, krypton, $SO_2$ air or mixtures thereof) filled. Such holes can provide an effective refractive index which is negative or depressed, e.g. compared to pure silica.

More specifically, referring to FIG. 3, the fiber core region 20 (with a step index, $n_1$), may be surrounded by first annular region 30 (with an index, $n_2$), which is situated adjacent to and is surrounded by the second annular region 50 having radial width, w3, which is further surrounded by a third annular region 60 (with an index, $n_4$, and a radial width, w4), which can optionally be surrounded by one or more polymer coatings 65. The relative percent index of refraction ($\Delta n$ %) in second annular region 50 fluctuates between −28% (index of void filled gas relative to that of silica) and that of the glass surrounding the holes (in this example it is silica, with the relative % index of refraction $\Delta n_5$ of about 0%). A typical average relative refractive index percent $\Delta n_{ave}$ of the second annular region 50 will be between −2% and −3%, relative to pure silica glass, depending on the dopants present in the glass surrounding the holes. That is, the index second annular region 50 fluctuates, and in the example of FIG. 3, the width of the gas filled holes, and/or the glass filled spacing $S_v$ between the gas filled holes is randomly distributed and/or are not equal to one another. That is, the holes are non-periodic. It is preferable that the mean distance between the holes is less than 5000 nm, more preferably less than 2000 nm, even more preferably less than 1000 nm, for example 750 nm, 500 nm, 400 nm, 300 nm, 200 nm or 100 nm. Preferably, at least 80%, and more preferably at least 90% of the holes have a maximum cross-sectional dimension Di of less than 1000 nm, preferably less than 500 nm. Even more preferably, the mean diameter of the holes is less than 1000 nm, more preferably less than 500 nm, and even more preferably less than 300 nm. The holes 16A are closed (surrounded by solid material) and are non-periodic. That is, the holes 16A may have the same size, or may be of different sizes. The distances between holes may be uniform (i.e., the same), or may be different. Preferably the second annular region 50 contains at least 10 holes, more preferably at least 50 holes, even more preferably at least 100 holes and most preferably at least 200 holes.

The core 20 of the fibers described herein have a profile volume, $V_1$, defined herein as:

$$2\int_0^{R_1} \Delta(r) r\, dr;$$

The second annular cladding region 50 has a profile volume, $V_3$, defined herein as:

$$2\int_{R_2}^{R_3} \Delta(r) r\, dr;$$

Preferably, $\Delta_{1MAX}<0.3\%$, $\Delta_{2MIN}>-0.05\%$, $\Delta_{2MAX}<0.05\%$, $\Delta_{3MIN}<-0.05\%$, and the absolute magnitude of the profile volume of the second annular region, $|V_3|$, is greater than 20%-$\mu m^2$. In some preferred embodiments, $\Delta_{3MIN}\geq-0.15\%$, more preferably, $\Delta_{3MIN}\geq-0.1\%$. In other preferred embodiments, $\Delta_{3MIN}<-0.15\%$, more preferably, $\Delta_{3MIN}\leq-0.2\%$ and even more preferably $\leq-0.3\%$. Preferably $\Delta_{3MIN}>-0.7\%$, more preferably $>-0.6\%$. When we say, for example, $\Delta<-0.15\%$, we mean $\Delta$ is more negative than −0.15%. Preferably $0.5<R_1/R_2<0.95$. In some embodiments, $0.6<R_1/R_2\leq0.9$. In other embodiments, $0.7<R_1/R_2\leq0.9$.

In some embodiments $W_2$ is greater than 1 micron and less than 5 microns, in some embodiments $W_2<4.5$ microns, and in some embodiments $W_2<4$ microns.

In some embodiments, 15%-$\mu m^2<|V_3|<150\%$-$\mu m^2$. In some embodiments, 20%-$\mu m^2<|V_3|<100\%$-$\mu m^2$. In some embodiments, 40%-$\mu m^2<|V_3|<80\%$-$\mu m^2$.

In some preferred embodiments, at 1550 nm the $A_{eff}\geq1.05\cdot(3.14\cdot MFD^2)/4$, where $A_{eff}$ and MFD are measured at 1550 nm.

Preferably, the optical fiber disclosed herein provides: a mode field diameter at 1550 nm is greater that 11 µm, and in some embodiments, between 11 µm and 15 µm, more preferably between 12.5 µm and 14.0 µm. Preferably, the effective area at 1550 nm is greater than 110 µm², more preferably greater than 115 µm², more preferably greater than 120 µm², even more preferably greater than 130 µm², even more preferably greater than 140 µm² and in some embodiments greater than 150 µm².

Exemplary Embodiments

Table 1 lists characteristics of modeled illustrative examples 1-7. The refractive index profiles of Examples 1-7 are similar to the fibers of FIGS. 1-3, with the following respective values. Note that in these examples $\Delta_2$ is about 0.0% (silica). In particular, $\Delta_1$ of the core region 20, is set forth, along with outer radius $R_1$ of core region 20, $\Delta_3$ of depressed region 50, outer radius $R_2$ of annular region 30, width $W_3$ of depressed region 50, volume $V_3$ of depressed region 50, theoretical cutoff wavelength, mode field diameter at 1310 nm, effective area at 1310 nm, dispersion at 1310 nm, dispersion slope at 1310 nm, kappa at 1310 nm, mode field diameter at 1550 nm, effective area at 1550 nm, dispersion at 1550 nm, dispersion slope at 1550 nm, and kappa at 1550 nm.

TABLE 1

| Parameter | Profile 1 | Profile 2 | Profile 3 | Profile 4 | Profile 5 | Profile 6 | Profile 7 |
|---|---|---|---|---|---|---|---|
| $\Delta 1$, % | 0.2 | 0.2 | 0.2 | 0.2 | 0.2 | 0.175 | 0.2 |
| $R_1$ µm | 9.06 | 8.2 | 7.84 | 7.626 | 7.47 | 8.8 | 7.355 |
| $\Delta 3\%$ | −0.5 | −0.5 | −0.5 | −0.5 | −0.5 | −0.5 | −0.5 |
| $R_2$ µm | 9.06 | 10 | 10.84 | 11.626 | 12.47 | 10.5 | 13. |
| $W_3$ µm | 5 | 5 | 5 | 5 | 5 | 5 | 5 |
| $V_3$ (%-µm²) | −57.8 | −62.5 | −66.7 | −70.6 | −74.9 | −65.0 | −79.3 |
| Theoretical Cutoff, µm | 1.550 | 1.545 | 1.539 | 1.535 | 1.531 | 1.530 | 1.530 |
| MFD, µm | 12.8 | 13.0 | 13.1 | 13.1 | 13.1 | 13.7 | 13.1 |
| $A_{eff}$ at 1.31 µm (µm²) | 154.2 | 151.3 | 148.5 | 146.3 | 144.3 | 171.1 | 142.7 |

TABLE 1-continued

| Parameter | Profile 1 | Profile 2 | Profile 3 | Profile 4 | Profile 5 | Profile 6 | Profile 7 |
|---|---|---|---|---|---|---|---|
| Dispersion at 1.31 µm (ps/nm/km) | 5.2 | 4.9 | 4.4 | 4.0 | 3.7 | 4.8 | 3.4 |
| Dispersion Slope at 1.31 µm (ps/nm$^2$/km) | 0.0939 | 0.094 | 0.0939 | 0.0936 | 0.0932 | 0.0939 | 0.0927 |
| kappa at 1.31 µm (nm) | 55.7 | 51.7 | 46.9 | 43.0 | 39.8 | 51.6 | 37.2 |
| MFD at 1.55 µm (µm) | 13.3 | 13.6 | 13.8 | 13.9 | 14.1 | 14.3 | 14.1 |
| $A_{eff}$ at 1.55 µm (µm$^2$) | 163.0 | 163.0 | 163.1 | 163.1 | 163.0 | 183.4 | 163.0 |
| Dispersion at 1.55 µm (ps/nm/km) | 23.7 | 23.4 | 23.0 | 22.5 | 22.2 | 23.4 | 21.8 |
| Dispersion Slope at 1.55 µm ((ps/nm$^2$/km) | 0.0648 | 0.0651 | 0.0652 | 0.0652 | 0.0651 | 0.0651 | 0.0648 |
| kappa at 1.55 µm (nm) | 366.0 | 359.4 | 351.8 | 345.4 | 340.2 | 359.0 | 336.1 |

All of the above examples will exhibit a 22 m cable cutoff less than 1550 nm, more preferably less than 1500 nm. All of the above examples include a germania doped core 20 surrounded by an undoped silica region 30, which in turn is surrounded by a fluorine doped depressed region 50 and an outer undoped silica cladding region 60. It is believed that all of the examples 1-6 exhibit <0.07 dB/turn increased attenuation bend loss when wound around a 20 mm diameter mandrel. Example 7 notably has a distance between R1 and R2 which is greater 5 microns. Note that Example 7 has a much larger MFD at 1550 nm compared to its effective area at 1550 nm than other examples. Mode field diameter is related to bend loss, consequently it is believed that examples 1-6 will have better bend loss per equivalent effective area than example 7. It is for this reason that it is preferred that the distance between R1 and R2 be less than or equal to 5 microns, more preferably less than 5 microns. Table 2 lists characteristics of several modeled examples wherein the depressed region is spaced from the core a distance of 5 microns or less. In particular, $\Delta_1$ of the core region 20, is set forth, along with outer radius $R_1$ of core region 20, $\Delta_2$ of region 30, outer $R_2$ of core region 30, $\Delta_3$ of depressed region 50 outer radius $R_2$ of annular region 30, width $W_3$ of depressed region 50, volume $V_3$ of depressed region 50, theoretical cutoff wavelength, mode field diameter at 1310 nm, effective area at 1310 nm, dispersion at 1310 nm, dispersion slope at 1310 nm, kappa at 1310 nm, mode field diameter at 1550 nm, effective area at 1550 nm, dispersion at 1550 nm, dispersion slope at 1550 nm, and kappa at 1550 nm.

TABLE 2

| Parameter | Profile 8 | Profile 9 | Profile 10 | Profile 11 | Profile 12 |
|---|---|---|---|---|---|
| Δ1% | 0.2 | 0.2 | 0.2 | 0.2 | 0.219 |
| R1 (µm) | 7.4 | 7.3 | 6.8 | 6.4 | 7.07 |
| Δ2% | 0.0 | 0.0 | 0.0 | 0.0 | 0.0 |
| R2 (µm) | 9 | 10 | 10 | 10 | 9.93 |
| Δ3% | −0.07 | −0.04 | −0.04 | −0.04 | −0.09 |
| R3 (µm) | 23 | 26 | 26 | 26 | 26.82 |
| W2 (µm) | 14 | 16 | 16 | 16 | 16.89 |
| $V_3$ (%-µm$^2$) | −31.4 | −23.0 | −23.0 | −23.0 | −56.0 |
| Theoretical cutoff (µm) | 1.501 | 1.533 | 1.439 | 1.362 | 1.433 |
| MFD 1.31 (µm) | 12.85 | 13 | 12.58 | 12.26 | 12.13 |
| Aeff 1.31 (µm$^2$) | 140 | 140 | 129.8 | 121 | 120.0 |
| Dispersion 1.31 (ps/nm/km) | 3.63 | 3.28 | 2.97 | 2.65 | 3.14 |
| Dispersion Slope 1.31 (ps/nm$^2$/km) | 0.0918 | 0.0915 | 0.091 | 0.0906 | 0.092 |
| kappa 1.31 (nm) | 39.5 | 35.87 | 32.67 | 29.64 | 34.2 |
| MFD 1.55 (µm) | 13.87 | 14.16 | 13.81 | 13.56 | 13.23 |
| Aeff 1.55 (µm$^2$) | 158 | 162 | 151 | 144 | 139.6 |
| Dispersion 1.55 (ps/nm/km) | 21.6 | 21 | 20.8 | 20.4 | 21.19 |
| Dispersion Slope 1.55 (ps/nm$^2$/km) | 0.063 | 0.0628 | 0.0625 | 0.0622 | 0.063 |
| kappa 1.55 (nm) | 343 | 338 | 333 | 328 | 335.0 |
| Parameter | Profile 13 | Profile 14 | Profile 15 | Profile 16 | |
| Δ1% | 0.220 | 0.220 | 0.227 | 0.21 | |
| R1 (µm) | 7.02 | 6.64 | 6.63 | 7 | |
| Δ2% | 0.0 | 0.0 | 0.0 | 0.0 | |
| R2 (µm) | 9.46 | 10.38 | 9.81 | 12 | |
| Δ3% | −0.08 | −0.07 | −0.08 | −0.2 | |

TABLE 2-continued

| | | | | |
|---|---|---|---|---|
| R3 (μm) | 26.62 | 27.47 | 26.73 | 19 |
| W2 (μm) | 17.16 | 17.09 | 16.92 | 7 |
| $V_3$ (%-μm$^2$) | −49.5 | −45.3 | −49.4 | −43.4 |
| Theoretical cutoff (μm) | 1.422 | 1.375 | 1.382 | 1.497 |
| MFD 1.31 (μm) | 12.05 | 11.86 | 11.71 | 12.6 |
| Aeff 1.31 (μm$^2$) | 118.4 | 112.9 | 110.6 | 131.7 |
| Dispersion 1.31 (ps/nm/km) | 3.15 | 2.63 | 2.81 | 3.32 |
| Dispersion Slope 1.31 (ps/nm$^2$/km) | 0.092 | 0.091 | 0.091 | 0.092 |
| kappa 1.31 (μm) | 34.4 | 28.9 | 30.7 | 36.0 |
| MFD 1.55 (μm) | 13.14 | 13.08 | 12.86 | 13.67 |
| Aeff 1.55 (μm$^2$) | 137.7 | 134.2 | 130.3 | 151.3 |
| Dispersion 1.55 (ps/nm/km) | 21.15 | 20.54 | 20.75 | 21.5 |
| Dispersion Slope 1.55 (ps/nm$^2$/km) | 0.063 | 0.063 | 0.063 | 0.064 |
| kappa 1.55 (nm) | 335.7 | 327.0 | 330.0 | 336.0 |

Table 4 lists characteristics of two additional modeled examples wherein the depressed region is spaced from the core a distance of 5 microns or less and the core is graded with an alpha less than 10, preferably less than 6, more preferably less than 4. The core preferably has a radius greater than 7, more preferably greater than 8, most preferably greater than 9 microns. In particular, $\Delta_1$ of the core region 20, is set forth, along with outer radius $R_1$ of core region 20, $\Delta_2$ of region 30, outer $R_2$ of core region 30, $\Delta_3$ of depressed region 50 outer radius $R_2$ of annular region 30, width $W_3$ of depressed region 50, volume $V_3$ of depressed region 50, theoretical cutoff wavelength, mode field diameter at 1310 nm, effective area at 1310 nm, dispersion at 1310 nm, dispersion slope at 1310 nm, kappa at 1310 nm, mode field diameter at 1550 nm, effective area at 1550 nm, dispersion at 1550 nm, dispersion slope at 1550 nm, and kappa at 1550 nm

TABLE 4

| Parameter | Profile 17 | Profile 18 |
|---|---|---|
| Δ1% | 0.27 | 0.27 |
| R1 (μm) | 10.00 | 10.00 |
| Alpha | 1.30 | 1.30 |
| Δ2% | 0.0 | 0.0 |
| R2 (μm) | 12.38 | 12.38 |
| Δ3% | −0.50 | −0.22 |
| R3 (μm) | 17.50 | 22.30 |
| W2 (μm) | 2.38 | 2.38 |
| $V_3$ (%-μm$^2$) | −77 | −76 |
| Δ4% | 0 | 0 |
| Theoretical cutoff (nm) | 1473 | 1493 |
| MFD 1.55 (μm) | 13.745 | 13.899 |
| Aeff 1.55 (μm$^2$) | 145.6 | 147.6 |
| Dispersion 1.55 (ps/nm/km) | 21.06 | 20.68 |
| Dispersion Slope 1.55 (ps/nm$^2$/km) | 0.067 | 0.066 |
| kappa 1.55 (nm) | 315.8 | 313.4 |

The 22 m cable cutoff values will be lower than the theoretical cutoff values given in all of the examples in the tables above. All of the above examples will have a 22 m cable cutoff less than 1500 nm, and profiles 12-18 will have a 22 m cable cutoff less than 1450 nm. All of the above examples include a germania doped core 20 surrounded by an undoped silica region 30, which in turn is surrounded by a fluorine doped depressed region 50 and an outer undoped silica cladding region 60. Preferably, the dispersion at 1550 nm is less than 23, more preferably less than 22, and most preferably less than 21 ps/nm/km. The proposed fiber designs have large effective areas, but by limiting the separation between the core and the moat to less than 5 microns, the mode field diameter is less than in comparative examples with $R_1/R_2<0.5$. The reduction in mode field diameter reduces the micro-bending loss without decreasing the effective area.

The fibers disclosed herein and the exemplary embodiments of the present invention shown above have an effective area ($A_{eff}$) of 110 μm$^2$ to 180 μm$^2$ (at 1550 nm) and/or MFD between about 11 μm and 15 μm. These fibers also have chromatic dispersion values at 1550 nm between about 17 ps/nm/km and about 23 ps/nm/km, more preferably between 18 ps/nm/km and about 22 ps/nm/km at 1550 nm, and dispersion slope at 1550 nm between 0.05 ps/nm$^2$/km and 0.07 ps/nm$^2$/km. The 1550 nm kappa value, defined as the ratio of the dispersion to the dispersion slope at 1550 nm, is preferably between 290 and 330 nm, more preferably between 300 and 320 nm. In some preferred embodiments, the effective area at 1550 nm is greater than 110 μm$^2$, more preferably greater than 120 μm$^2$, even more preferably greater than 130 μm$^2$, even more preferably greater than 140 μm$^2$ and most preferably greater than 150 μm$^2$. One advantage of the design is that the cable cutoff wavelength is preferably lower than 1450 nm, more preferably lower than 1400 nm, even more preferably lower than 1350 nm. These fibers also have chromatic dispersion values at 1310 nm between about 2 ps/nm/km and about 5 ps/nm/km, more preferably between 2.5 ps/nm/km and about 4 ps/nm/km, and dispersion slope at 1310 nm between 0.088 ps/nm$^2$/km and 0.095 ps/nm$^2$/km. The 1310 nm kappa value, defined as the ratio of the dispersion to the dispersion slope at 1310 nm, is preferably between 20 and 60 nm, more preferably between 20 and 40 nm. In some preferred embodiments, the effective area at 1310 nm is greater than 100 μm$^2$, more preferably greater than 110 μm$^2$, even more preferably greater than 120 μm$^2$, and most preferably greater than 130 μm$^2$.

The bending losses may be minimized by choosing: (i) the proper location of the second annular region and (ii) proper values of the volume of the second annular region 50, which volume is defined as the product of the cross sectional area of the second annular region's sectional area and the absolute value of delta $\Delta_{3min}$ in percent. The volume of the second annular region 50 affects the fiber and cable cutoff wavelengths. To have a cable cutoff wavelength less than 1500 nm, it is preferable that the absolute value of the volume $|V_3|$ of the second annular region 50 be less than about 100%-μm$^2$.

As discussed above, second annular region 50 can be formed either by boron and/or fluorine doping or by having a plurality of gas filed holes (e.g. air filled holes) imbedded in the second annular fiber region 50. Bending performance is an important property of optical fibers. In a conventional large area fiber (with $A_{eff}$ greater than about 110 µm² or larger) the bending performance degrades dramatically as the optical effective area increases. However, optical fibers according to the embodiments of present invention exhibit small bend loss even when their effective areas exceed 110 µm², or 120 µm², 130 µm², 140 m², 150 µm² or more. Optical fibers according to the present invention, for example fibers disclosed in Table 1 and 2, exhibit superior macrobend loss resistance on a level comparable or better than conventional fibers with known and acceptable bending performance such as SMF-28e® optical fiber.

Preferred embodiments of the optical fibers disclosed herein exhibit bending losses at 1550 nm of no more than 0.7 dB/turn, preferably no more than 0.5 dB/turn and preferably less than 0.4 dB/turn and even more preferably less than 0.35 dB/turn at 20 mm bending diameter; and/or less than 0.01 dB/turn at 30 mm bending diameter. An exemplary fiber was made consisting of a germania doped core 20 having a maximum delta of 0.15 percent and a radius of 7.15 microns. The core was surrounded by an undoped silica region 30, with an outer radius of 7.53 microns (R1/R2=0.95), which in turn was surrounded by a fluorine doped depressed region 50 that was 12 microns wide and having a minimum relative refractive index of −0.2 percent and an outer undoped silica cladding region 60. The fiber was drawn to an outer diameter of 125 microns and exhibited the following properties:

| Spectral Attenuation | | Cutoff | | Mode Field | | 10 mm | 20 mm |
|---|---|---|---|---|---|---|---|
| ATTEN | ATTEN | | 22M | Diameter | | Bend Loss | Bend loss |
| @ 1310 nm, (dB/km) | @ 1550 nm, (dB/km) | 2M CUTOFF, nm | CABLE CUTOFF, nm | MFD @ 1310 nm, µm | MFD @ 1550 nm, µm | 10 mm dB/Turn at 1550 nm | 20 mm dB/Turn at 1550 nm |
| 0.35 | 0.203 | 1627 | 1456 | 11.52 | 12.48 | 0.363 | 0.086 |

Some embodiments of the optical fiber of the present invention optical fiber have bending losses at 1550 nm of no greater than about 0.25 dB/turn, preferably less than 0.20 dB/turn, more preferably less than 0.1 dB/turn, at 20 mm bending diameter, and/or no greater than 0.008 dB/turn at 30 mm bending diameter. Some embodiments of the optical fiber of the present invention optical fiber have bending losses at 1550 nm of no greater than about 1.0 dB/turn, preferably less than 0.8 dB/turn, more preferably less than 0.4 dB/turn, at 10 mm bending diameter.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
    a glass core extending from a centerline to a radius $R_1$ wherein $R_1$ is greater than about 5 µm; a glass cladding surrounding and in contact with the core, said cladding comprising a depressed annular region, the inner radius of said depressed annular region is spaced from said core a distance greater than 1 µm and less than 5 µm;
    wherein the core and the cladding provide a fiber with cable cutoff less than 1550 nm, and an effective area at 1550 nm greater than 120 µm² and bend loss of ≦0.7 dB/turn on a 20 mm diameter mandrel.

2. The optical fiber of claim 1, further comprising a first inner annular region extending from a radius $R_1$ to a radius $R_2$, the first annular region comprising a radial width, $W_2=R_2-R_1$,
    and said depressed annular region extends from a radius $R_2$ to a radius $R_3$, and comprises a radial width, $W_3=R_3-R_2$, and said fiber further comprises a third annular region surrounding the second annular region and extending from the radius $R_3$ to an outermost glass radius $R_4$; and
    (ii) the core comprises a maximum relative refractive index, $\Delta_{1MAX}$, relative to the third annular region;
    wherein the first annular region has a refractive index delta $\Delta_2(r)$;
    wherein the depressed annular region comprises:
        a minimum relative refractive index, $\Delta_{3MIN}$, relative to the third annular region;
    wherein $\Delta_{1MAX} > \Delta_{2MAX} > \Delta_{3MIN}$, and $\Delta_{2MIN} > \Delta_{3MIN} < 0$, and wherein $\Delta_{3MIN}$ is greater than −0.25%.

3. The optical fiber according to claim 2 wherein $\Delta_{1MAX}$ is greater than about 0.1% and less than about 0.3%; and $\Delta_2(r)$, is less than about 0.05% and greater than about −0.05%.

4. The optical fiber of claim 2, wherein $\Delta_{3MIN}$, relative to the third annular region, is less than about −0.05% and greater than −0.2%.

5. The optical fiber of claim 2 wherein the depressed annular region comprises a profile volume, $V_3$, equal to:

$$2\int_{R_2}^{R_3} \Delta(r) r \, dr;$$

wherein $|V_3|$ is at least 20%-µm².

6. The optical fiber of claim 2 wherein $R_1/R_2 > 0.6$.

7. The optical fiber of claim 2 wherein $W_3$ is between 1 µm and 10 µm.

8. The optical fiber of claim 2 wherein 20%-µm² $< |V_3| <$ 80%-µm².

9. The optical fiber of claim 1, wherein $A_{eff} \geqq 1.05 \cdot (3.14 \cdot MFD^2)/4$, where $A_{eff}$ and MFD are measured at 1550 nm.

10. The optical fiber of claim 1 wherein said effective area at 1550 nm is at least 125 µm².

11. The optical fiber of claim 1 wherein $R_1/R_2 > 0.6$.

12. The optical fiber of claim 1 wherein the core in combination with the cladding provide a bend loss at 1550 nm wavelength of less than 0.25 dB/turn on a 20 mm diameter mandrel.

13. The optical fiber of claim 1 wherein the dispersion at 1550 nm is less than 22 ps/nm/km.

14. An optical fiber according to claim 1,
    wherein the depressed annular region comprises:
        a minimum relative refractive index, $\Delta_{3MIN}$, relative to the third annular region;
        wherein $\Delta_{1MAX} > \Delta_{2MAX} > \Delta_{3MIN}$, and $\Delta_{2MIN} > \Delta_{3MIN} < 0$, and includes silica based glass with at least 10 randomly dispersed closed holes situated therein, and (i) mean distance between the holes is less than 5000 nm, and (ii) at least 80% of the holes have a maximum cross-sectional dimension Di of less than 1000 nm; and
    wherein the core and the cladding provide a fiber with cable cutoff less than 1500 nm, and an effective area at 1550 nm greater than 110 μm² and bend loss of no more than 0.5 dB/turn on a 20 mm diameter mandrel.

15. An optical fiber comprising:
    a glass core extending from a centerline to a radius $R_1$ wherein $R_1$ is greater than about 5 μm; a glass cladding surrounding and in contact with the core, said cladding comprising a depressed annular region comprising a minimum relative refractive index $\Delta_{3MIN}$ which is less than about −0.25%, the inner radius of said depressed annular region is spaced from said core a distance greater than 1 μm and less or equal to than 5 μm;
    wherein the core and the cladding provide a fiber with cable cutoff less than 1500 nm, and an effective area at 1550 nm greater than 110 μm² and bend loss of $\leqq 0.7$ dB/turn on a 20 mm diameter mandrel.

16. The optical fiber of claim 15, further comprising a dispersion at 1550 nm which is less than 22 ps/nm/km.

17. The optical fiber of claim 15, further comprising an attenuation at 1550 nm which is less than 0.19 dB/km.

18. The optical fiber of claim 15, wherein said core is a graded index core having an alpha less than 10.

* * * * *